(12) United States Patent
Sakai et al.

(10) Patent No.: US 11,424,464 B2
(45) Date of Patent: Aug. 23, 2022

(54) FUEL CELL SYSTEM, METHOD OF CONTROLLING FUEL CELL SYSTEM, AND STORAGE MEDIUM

(71) Applicant: HONDA MOTOR CO., LTD., Tokyo (JP)

(72) Inventors: Ryoji Sakai, Wako (JP); Akihiro Matsui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 17/024,832

(22) Filed: Sep. 18, 2020

(65) Prior Publication Data
US 2021/0098806 A1    Apr. 1, 2021

(30) Foreign Application Priority Data

Sep. 27, 2019 (JP) .............................. JP2019-176864

(51) Int. Cl.
*H01M 8/04858* (2016.01)
*H01M 16/00* (2006.01)
(Continued)

(52) U.S. Cl.
CPC ... *H01M 8/04932* (2013.01); *H01M 8/04626* (2013.01); *H01M 10/44* (2013.01);
(Continued)

(58) Field of Classification Search
CPC ......... H01M 8/04932; H01M 8/04626; H01M 10/44; H01M 10/46; H01M 2220/20;
(Continued)

(56) References Cited

U.S. PATENT DOCUMENTS

| 2014/0203636 A1* | 7/2014 | Goetz ................ H01M 16/006 307/10.1 |
| 2017/0338653 A1* | 11/2017 | Toshiya .................... H02J 3/18 |
| 2019/0089190 A1* | 3/2019 | Yang ....................... H02J 7/045 |

FOREIGN PATENT DOCUMENTS

| JP | 01-038969 | 2/1989 |
| JP | 2014-056771 | 3/2014 |
| JP | 2019-125461 | 7/2019 |

OTHER PUBLICATIONS

Japanese Office Action for Japanese Patent Application No. 2019-176864 dated Jul. 13, 2021.

* cited by examiner

*Primary Examiner* — Nathaniel R Pelton
(74) *Attorney, Agent, or Firm* — Amin, Turocy & Watson, LLP

(57) ABSTRACT

A fuel cell system includes fuel cell, electrical storage device that stores electric power generated by the fuel cell, and control device of the fuel cell, the control device performs first control which causes the fuel cell to generate power and increases charging rate of the electrical storage device and second control which restricts output of the fuel cell to be smaller than that in the first control and decreases charging rate of the electrical storage device, and when switching condition, in which electric power demand from the external devices becomes greater than predetermined electric power or state in which electric power demand from the external devices is greater than the predetermined electric power continues for predetermined time, is satisfied, the control device increases power output by the fuel cell during the first control being performed to be larger than that before the switching condition was satisfied.

5 Claims, 10 Drawing Sheets

(51) Int. Cl.
*H01M 8/04537* (2016.01)
*H01M 10/46* (2006.01)
*H01M 10/44* (2006.01)
*H02J 7/00* (2006.01)
*B60L 58/12* (2019.01)
*B60L 50/70* (2019.01)
*B60L 58/30* (2019.01)
*B60L 53/54* (2019.01)

(52) U.S. Cl.
CPC ......... *H01M 10/46* (2013.01); *H01M 16/006* (2013.01); *H02J 7/0048* (2020.01); *B60L 50/70* (2019.02); *B60L 53/54* (2019.02); *B60L 58/12* (2019.02); *B60L 58/30* (2019.02); *H01M 2220/20* (2013.01); *H01M 2250/20* (2013.01)

(58) Field of Classification Search
CPC ........... H01M 2250/20; H01M 16/0006; H02J 7/0048; H02J 2300/30
USPC ........................................................ 320/101
See application file for complete search history.

FUEL CELL SYSTEM, METHOD OF CONTROLLING FUEL CELL SYSTEM, AND STORAGE MEDIUM

CROSS-REFERENCE TO RELATED APPLICATION

Priority is claimed on Japanese Patent Application No. 2019-176864, filed Sep. 27, 2019, the content of which is incorporated herein by reference.

BACKGROUND OF THE INVENTION

Field of the Invention

The present invention relates to a fuel cell system, a method of controlling a fuel cell system, and a storage medium.

Description of Related Art

In the related art, when supplying power from a fuel cell vehicle to an external power supply device, a technology is known for ensuring an operating efficiency of a fuel cell stack by maintaining a flow rate of air supplied to the fuel cell stack at a predetermined flow rate or more, regardless of a state of the fuel cell stack, in a case a state of the fuel cell stack is intermittently switched between efficiency priority driving and output limiting driving or power generation stoppage on the basis of a state of charge (SOC) of a battery is known, (for example, see Japanese Unexamined Patent Application, First Publication No. 2014-56771).

SUMMARY OF THE INVENTION

However, in the related art, variation in electric power demand on the side of devices that are targets for supply of power have not been considered.

An aspect of the present invention is directed to providing a fuel cell system, a method of controlling a fuel cell system, and a storage medium that are capable of stably performing supply of electric power.

A fuel cell system, a method of controlling a fuel cell system, and a storage medium according to the present invention employ the following configurations.

(1) A fuel cell system according to an aspect of the present invention includes a fuel cell; an electrical storage device configured to store electric power generated by the fuel cell; and a control device configured to perform power generation control for at least the fuel cell, wherein the control device acquires a charging rate of the electrical storage device, when the electric power stored in the electrical storage device is supplied to external devices, the control device performs a first control which causes the fuel cell to generate power and increases a charging rate of the electrical storage device and a second control which restricts a power generation output of the fuel cell to be smaller than that in the first control and decreases a charging rate of the electrical storage device, and when a switching condition, in which an electric power demand from the external devices becomes greater than a predetermined electric power or a state in which an electric power demand from the external devices is greater than the predetermined electric power continues for a predetermined time, is satisfied, the control device increases a power generation output generated by the fuel cell during the first control being performed to be larger than that before the switching condition was satisfied.

(2) In the aspect of the above-mentioned (1), before the switching condition is satisfied, the control device may cause the fuel cell to generate power which has a maximum power generation efficiency.

(3) In the aspect of the above-mentioned (1) or (2), after the switching condition is satisfied, the control device may cause the fuel cell to generate power that is an upper limit specified by regulations.

(4) A method of controlling a fuel cell system according to another aspect of the present invention is performed by a control device of a fuel cell system including: a fuel cell; and an electrical storage device configured to store electric power generated by the fuel cell, the method including: performing power generation control for at least the fuel cell; acquiring a charging rate of the electrical storage device; when the electric power stored in the electrical storage device is supplied to external devices, performing a first control which causes the fuel cell to generate power and increases a charging rate of the electrical storage device and a second control which restricts a power generation output of the fuel cell to be smaller than that in the first control and decreases a charging rate of the electrical storage device; and when a switching condition, in which an electric power demand from the external devices becomes greater than a predetermined electric power or a state in which an electric power demand from the external devices is greater than the predetermined electric power continues for a predetermined time, is satisfied, increasing a power generation output generated by the fuel cell during the first control being performed to be larger than that before the switching condition was satisfied.

(5) A storage medium according to another aspect of the present invention, has a program stored thereon, the program being configured to cause a control computer of a fuel cell system including: a fuel cell; and an electrical storage device configured to store electric power generated by the fuel cell, to perform processing of performing power generation control for at least the fuel cell; processing of acquiring a charging rate of the electrical storage device; when the electric power stored in the electrical storage device is supplied to external devices, processing of alternately performing a first control which causes the fuel cell to generate power and increases a charging rate of the electrical storage device and a second control which restricts a power generation output of the fuel cell to be smaller than that in the first control and decreases a charging rate of the electrical storage device; and when a switching condition, in which an electric power demand from the external devices becomes greater than a predetermined electric power or a state in which an electric power demand from the external devices is greater than the predetermined electric power continues for a predetermined time, is satisfied, processing of increasing a power generation output generated by the fuel cell during the first control being performed to be larger than that before the switching condition was satisfied.

According to the aspects of the above-mentioned (1) to (5), it is possible to stably perform supply of electric power.

DETAILED DESCRIPTION OF THE INVENTION

First Embodiment

Hereinafter, a first embodiment of a fuel cell system, a method of controlling a fuel cell system, and a storage medium, on which a program is stored, of the present invention will be described with reference to the accompanying drawings. In the following description, an electrically driven vehicle 1 is a fuel cell vehicle using electric power generated in a fuel cell as electric power for traveling. In addition, in the following description, control devices in the fuel cell system may be realized by executing a program (software) using a hardware processor such as a central processing unit (CPU) or the like. In addition, some or all of these components may be realized by hardware (a circuit part; including circuitry) such as a large scale integration (LSI), an application specific integrated circuit (ASIC), a field programmable gate array (FPGA), a graphics processing unit (GPU), or the like, or may be realized by cooperation of software and hardware. The program may have been previously stored in a storage device such as a hard disc drive (HDD), a flash memory, or the like (a storage device including a non-transient storage medium), stored in a detachable storage medium such as a digital video disc (DVD), a compact disc read only memory (CD-ROM), or the like, or installed on a HDD or a flash memory by mounting the storage medium (non-transient storage medium) on a drive device.

[Electrically Driven Vehicle]

Figure 1:
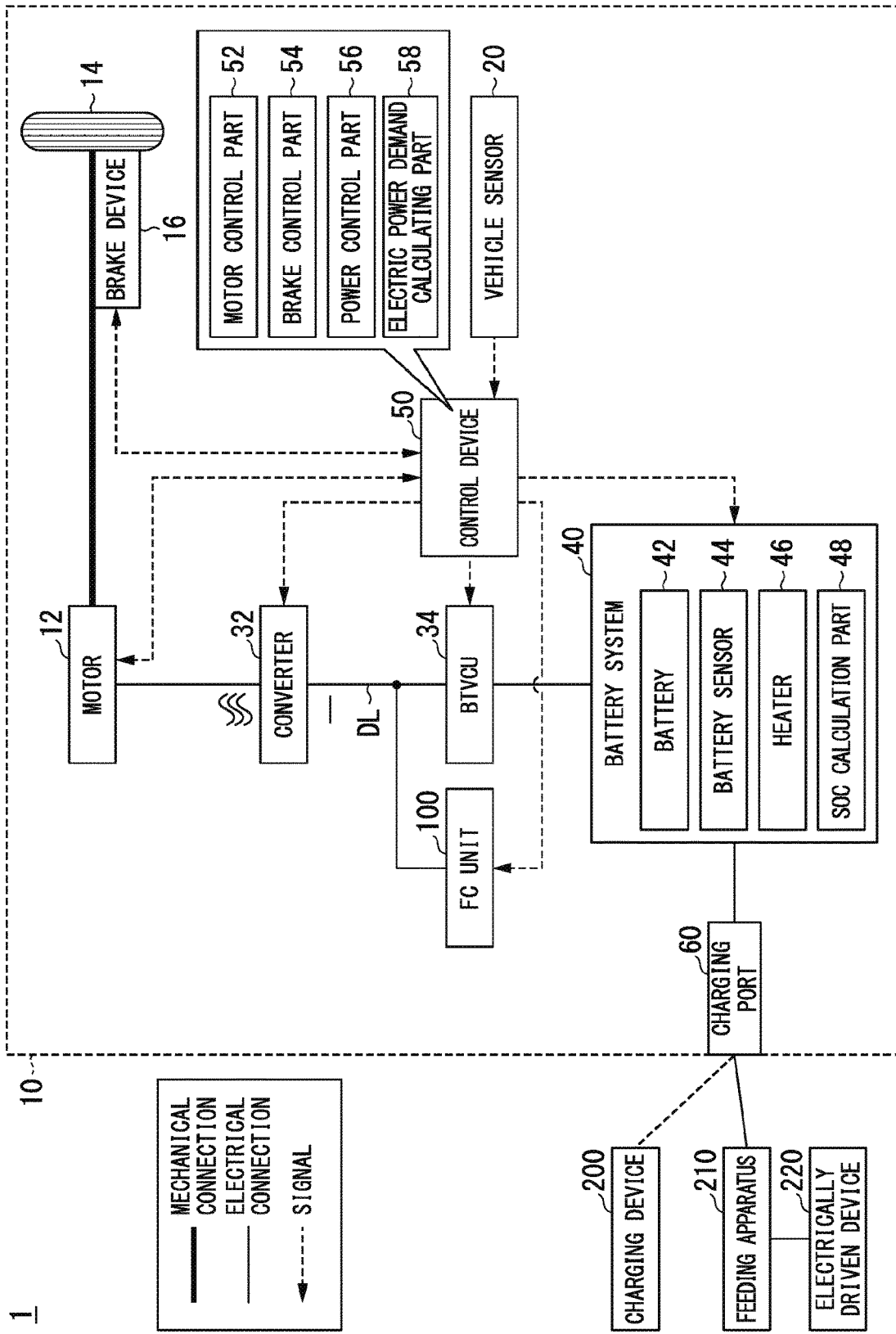
FIG. 1 is a view showing an example of a configuration of an electrically driven vehicle according to a first embodiment.

FIG. 1 is a view showing an example of a configuration of a fuel cell system 10. The fuel cell system 10 is, for example, a system which is mounted in the electrically driven vehicle 1. The fuel cell system 10 is a stationary type system. The electrically driven vehicle 1 is a fuel cell vehicle using the electric power generated in a fuel cell as electric power for traveling. The fuel cell system 10 includes at least a motor 12, driving wheels 14, a brake device 16, a vehicle sensor 20, a converter 32, a battery voltage control unit (BTVCU) 34, a battery system (an electrical storage device) 40, a control device 50, a charging port 60 and a fuel cell (FC) unit 100. The fuel cell system 10 may include a feeding apparatus 210.

The motor 12 is, for example, a three-phase alternating current motor. A rotor of the motor 12 is connected to the driving wheels 14. The motor 12 outputs a driving force used for traveling of the electrically driven vehicle 1 to the driving wheels 14 using at least one of electric power generated by the FC unit 100 and electric power stored by the battery system 40. In addition, the motor 12 generates power using kinetic energy of the vehicle upon deceleration of the vehicle.

The brake device 16 includes, for example, a brake caliper, a cylinder configured to transmit a hydraulic pressure to the brake caliper, and an electric motor configured to generate a hydraulic pressure in the cylinder. The brake device 16 may include a mechanism configured to transmit a hydraulic pressure generated by an operation of a brake pedal to the cylinder via a master cylinder as a backup. Further, the brake device 16 is not limited to the above-mentioned configuration and may be an electronically-controlled hydraulic brake device configured to transmit a hydraulic pressure of the master cylinder to the cylinder.

The vehicle sensor 20 includes an accelerator opening sensor, a vehicle speed sensor and a brake depression amount sensor. The accelerator opening sensor is attached to an accelerator pedal that is an example of an operator configured to receive an acceleration instruction of a driver, detects an operation amount of an accelerator pedal, and outputs the operation amount to the control device 50 as an accelerator opening degree. The vehicle speed sensor includes, for example, wheel speed sensors attached to wheels, and a speed calculator, combines the wheel speeds detected by the wheel speed sensors to derive a speed of the vehicle (a vehicle speed), and outputs the vehicle speed to the control device 50. The brake depression amount sensor is attached to a brake pedal, detects an operation amount of the brake pedal, and outputs the operation amount to the control device 50 as a brake depression amount.

The converter 32 is, for example, an AC-DC converter. A DC-side terminal of the converter 32 is connected to a DC link DL. The battery system 40 is connected to the DC link DL via the BTVCU 34. The converter 32 converts an AC voltage generated by the motor 12 into a DC voltage and outputs the converted DC voltage to the DC link DL.

The BTVCU 34 is, for example, a boosting type DC-DC converter. The BTVCU 34 boosts the DC voltage supplied from the battery system 40 and outputs the boosted DC voltage to the DC link DL. In addition, the BTVCU 34 outputs a regenerative voltage supplied from the motor 12 or a FC voltage supplied from the FC unit 100 to the battery system 40.

The battery system 40 includes, for example, a battery 42, a battery sensor 44, a heater 46 and an SOC calculating part 48.

The battery 42 is, for example, a secondary battery such as a lithium ion battery or the like. The battery 42 stores, for example, electric power generated in the motor 12 or the FC unit 100, and performs discharge for traveling of the electrically driven vehicle 1.

The battery sensor 44 includes, for example, a current sensor, a voltage sensor and a temperature sensor. The battery sensor 44 detects, for example, a current value, a voltage value and a temperature of the battery 42. The battery sensor 44 outputs the detected current value, voltage value, temperature, and the like, to the control device 50.

The heater 46 is provided at a position where heat is transferred to the battery 42, and heats the battery 42 using electric power stored in the battery 42. The heater 46 heats the battery 42 under control by a battery ECU (not shown) and operates, for example, when a temperature of the battery 42 detected by the battery sensor 44 is less than a predetermined temperature.

The SOC calculating part 48 calculates a state of charge (SOC; hereinafter, also referred to as "a battery charging rate") of the battery 42 on the basis of the output of the battery sensor 44.

The FC unit 100 includes a fuel cell. The fuel cell generates power by reacting hydrogen contained in a fuel gas as a fuel with oxygen contained in air as oxidizer. The FC unit 100 outputs the generated electric power to, for example, a DC link between the converter 32 and the BTVCU 34. Accordingly, the electric power supplied by the FC unit 100 is supplied to the motor 12 via the converter 32, supplied to the battery system 40 via the BTVCU 34, or stored in the battery 42.

The control device 50 includes, for example, a motor control part 52, a brake control part 54, an electric power control part 56, and an electric power demand calculating part 58. The motor control part 52, the brake control part 54, the electric power control part 56, and the electric power demand calculating part 58 may be substituted with separate control devices, for example, control devices that are referred to as a motor ECU, a brake ECU and a battery ECU.

The motor control part 52 calculates a driving force required for the motor 12 on the basis of the output of the vehicle sensor 20, and controls the motor 12 such that the calculated driving force is output.

The brake control part 54 calculates a braking force required by the brake device 16 on the basis of the output of the vehicle sensor 20, and controls the brake device 16 such that the calculated braking force is output.

The electric power control part 56 calculates a total required electric power required for the battery system 40 and the FC unit 100 on the basis of the output of the vehicle sensor 20. For example, the electric power control part 56 calculates a torque to be output by the motor 12 on the basis of the accelerator opening degree and the vehicle speed, and calculates a total required electric power by adding a driving shaft demand electric power obtained from the torque and a rotational speed of the motor 12, and the electric power required by auxiliary machinery and the like.

The electric power control part 56 calculates a required charge/discharge electric power of the battery 42 from the SOC of the battery 42. Then, the electric power control part 56 subtracts the a required charge/discharge electric power of the battery 42 from the total required electric power (a discharge side is assumed as positive), calculates a required FC electric power required by the FC unit 100, and causes the FC unit 100 to generate the electric power corresponding to the calculated a required FC electric power.

The electric power demand calculating part 58 calculates an electric power demand required for the electrically driven device 220 outside the electrically driven vehicle 1. For example, The electric power demand calculating part 58 calculates an electric power demand from the electrically driven device 220 on the basis of the variation per hour of the SOC of the battery 42 calculated by the SOC calculating part 48, when the electrically driven device 220 is connected to the charging port 60 via the feeding apparatus 210.

The charging port 60 is directed toward a side outward from a vehicle body of the electrically driven vehicle 1. The charging port 60 is connected to a charging device 200 or the feeding apparatus 210. The charging device 200 is a device configured to supply electric power to the battery system 40 using a commercial power supply (or acquire electric power when V2G is performed). When a charging connector connected to the charging device 200 is inserted into the charging port 60, the charging port 60 and the charging device 200 are connected to each other.

The feeding apparatus 210 is able to be connected to an electrically driven device 220, and the electric power supplied from the battery system 40 is able to be supplied to the electrically driven device 220. The feeding apparatus 210 has, for example, an electric power converter built therein, converts current supplied from the battery system 40 via the charging port 60, for example, direct current, into alternating current, and feeds the alternating current to the electrically driven device 220. The electrically driven device 220 is an electrically driven device that is usable outdoors, for example, at a camping ground or the like, and includes a rice cooker, a large size heater, an air-conditioner, or the like.

The electric power control part 56 performs generation control of the FC unit 100 when the electric power stored in the battery system 40 is supplied to the electrically driven device 220 via the feeding apparatus 210. In this case, the electric power control part 56 alternately executes first control of causing the FC unit 100 to generate power and increasing the SOC of the battery 42 and second control of restricting a power generation output of the FC unit 100 to be smaller than that in the first control and decreasing the SOC of the battery 42. For example, when a switching condition in which an electric power demand from the electrically driven device 220 is greater than the predetermined electric power is satisfied, the electric power control part 56 increases a power output generated by the FC unit 100 when the first control is performed in comparison to before the switching condition was satisfied. For example, while the electric power control part 56 causes the FC unit 100 to generate power to a first power generation output before the switching condition was satisfied, the electric power control part 56 causes the FC unit 100 to generate power to a second power generation output when the switching condition was satisfied. For example, the first power generation output is a power generation output with high power generation efficiency of the FC unit 100. For example, the first power generation output may be a power generation output with maximized power generation efficiency of the FC unit 100. For example, the second power generation output is a power generation output that is an upper limit specified by regulations (for example, a power generation output around 10 [kW]). The first power generation output and the second power generation output may be fixed values or variable values.

The electric power control part 56 is switched to the second control when the SOC of the battery 42 is a first threshold or more while the first control is performed, and switched to the first control when the SOC of the battery 42 is decreased to be less than a second threshold while the second control is performed.

<FC Unit 100>

Figure 2:
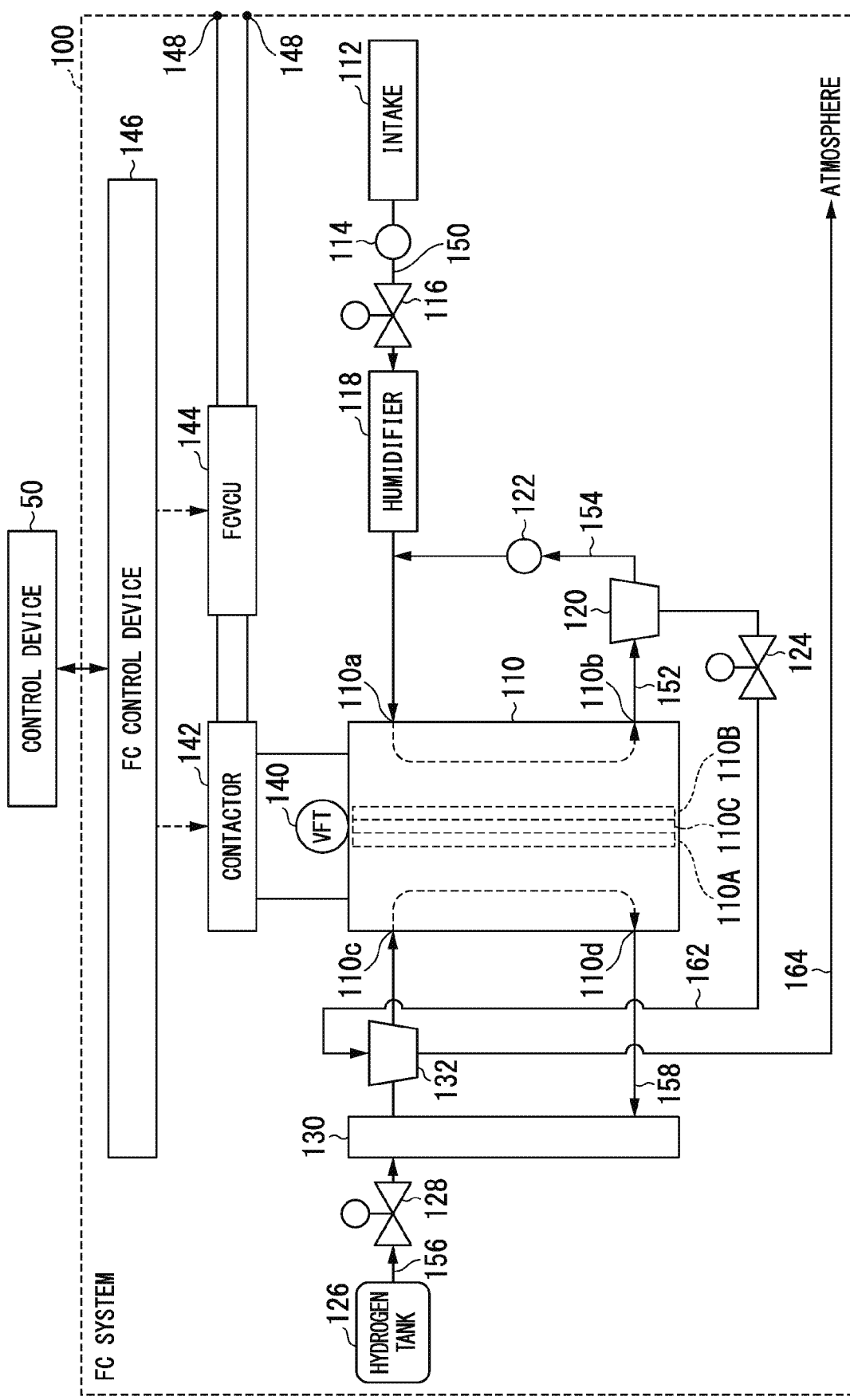
FIG. 2 is a view showing an example of a configuration of a fuel cell (FC) unit according to the first embodiment.

FIG. 2 is a view showing an example of a configuration of the FC unit 100 according to the first embodiment.

As shown in FIG. 2, the FC unit 100 includes, for example, an FC stack 110, an intake 112, an air pump 114, a sealing inlet valve 116, a humidifier 118, a gas-liquid separator 120, an exhaust recirculation pump 122, a drain valve 124, a hydrogen tank 126, a hydrogen supply valve 128, a hydrogen circulating part 130, a gas-liquid separator 132, a temperature sensor 140, a contactor 142, a fuel cell voltage control unit (FCVCU) 144 and an FC control device 146.

The FC stack 110 includes a fuel cell stack (not shown) in which a plurality of fuel cells are stacked, and a pair of end plates (not shown) configured to sandwich the fuel cell stack from both sides in a stacking direction.

The fuel cell includes a membrane electrode assembly (MEA), and a pair of separators that sandwich the membrane electrode assembly from both sides in a joining direction.

The membrane electrode assembly includes an anode 110A constituted by an anode catalyst and a gas diffusion layer, a cathode 110B constituted by a cathode catalyst and a gas diffusion layer, and a solid polymer electrolyte membrane 110C constituted by a cation-exchange membrane or the like sandwiched between the anode 110A and the cathode 110B from both sides in a thickness direction.

A fuel gas that contains hydrogen as a fuel is supplied to the anode 110A from the hydrogen tank 126, and air that is an oxidant gas (reactant gas) containing oxygen as an oxidizer is supplied to the cathode 110B from the air pump 114.

The hydrogen supplied to the anode 110A is ionized by a catalyst reaction on the anode catalyst, and hydrogen ions are moved to the cathode 110B via the solid polymer electrolyte membrane 110C that is appropriately humidified. Electrons generated according to movement of the hydrogen ions can be taken out to the external circuit (the FCVCU 144 or the like) as the direct current.

The hydrogen ions moved onto the cathode catalyst of the cathode 110B from the anode 110A react with the oxygen supplied to the cathode 110B and the electrons on the cathode catalyst to generate water.

The air pump 114 includes a motor or the like driven and controlled by the FC control device 146, takes and compresses air from the outside via the intake 112 using the driving force of the motor, and sends the air after compression to an oxidant gas supply path 150 connected to the cathode 110B.

The sealing inlet valve 116 is provided in the oxidant gas supply path 150 that connects the air pump 114 and a cathode supply port 110a configured to supply air to the cathode 110B of the FC stack 110, and opened and closed by control of the FC control device 146.

The humidifier 118 humidifies the air sent to the oxidant gas supply path 150 from the air pump 114. More specifically, the humidifier 118 includes a water-permeable membrane such as a hollow fiber membrane or the like, and adds moisture to the air by bringing the air from the air pump 114 into contact with the moisture via the water-permeable membrane.

The gas-liquid separator 120 separates a cathode exhaust gas and liquid water discharged to an oxidant gas discharge path 152 which have not been consumed by the cathode 110B. The cathode exhaust gas separated from the liquid water by the gas-liquid separator 120 flows into an exhaust gas recirculation path 154.

The exhaust recirculation pump 122 is provided in the exhaust gas recirculation path 154, mixes the cathode exhaust gas flowing to the exhaust gas recirculation path 154 from the gas-liquid separator 120 with the air flowing through the oxidant gas supply path 150 from the sealing inlet valve 116 toward the cathode supply port 110a, and supplies the mixture to the cathode 110B again.

The liquid water separated from the cathode exhaust gas by the gas-liquid separator 120 is discharged to the gas-liquid separator 132 provided in a fuel gas supply path 156 via a connecting path 162. The liquid water discharged to the gas-liquid separator 132 is discharged to the atmosphere via a drain pipe 164.

The hydrogen tank 126 stores hydrogen in a compressed state.

The hydrogen supply valve 128 is provided in the fuel gas supply path 156 that connects the hydrogen tank 126 and an anode supply port 110c configured to supply hydrogen to the anode 110A of the FC stack 110. The hydrogen supply valve 128 supplies the hydrogen stored in the hydrogen tank 126 to the fuel gas supply path 156 when the valve is opened by control of the FC control device 146.

The hydrogen circulating part 130 circulates the anode exhaust gas discharged to a fuel gas discharge path 158 through the fuel gas supply path 156 without being consumed by the anode 110A.

The gas-liquid separator 132 separates the anode exhaust gas and the liquid water that circulate from the fuel gas discharge path 158 to the fuel gas supply path 156 f using an action of the hydrogen circulating part 130. The gas-liquid separator 132 supplies the anode exhaust gas separated from the liquid water to the anode supply port 110c of the FC stack 110.

The temperature sensor 140 detects temperatures of the anode 110A and the cathode 110B of the FC stack 110, and outputs the detection signals to the FC control device 146.

The contactor 142 is provided between the anode 110A and the cathode 110B of the FC stack 110 and the FCVCU 144. The contactor 142 electrically connects or disconnects a space between the FC stack 110 and the FCVCU 144 on the basis of the control from the FC control device 146.

The FCVCU 144 is, for example, a boosting type DC-DC converter. The FCVCU 144 is disposed between the anode 110A and the cathode 110B of the FC stack 110 and an electric load via the contactor 142. The FCVCU 144 boosts a voltage of an output terminal 148 connected to the side of the electric load to a target voltage determined by the FC control device 146. For example, the FCVCU 144 boosts the voltage output from the FC stack 110 to the target voltage and outputs the boosted voltage to the output terminal 148.

The FC control device 146 performs warming-up control of the FC unit 100 when it is determined by the electric power control part 56 that warming-up of the FC unit 100 is necessary and a required FC electric power required by the FC unit 100 is a predetermined value or more. For example, the electric power control part 56 acquires a detection signal of the temperature sensor 140 from the FC control device 146, and determines that warming-up of the FC unit 100 is required when the temperature of the FC stack 110 detected by the temperature sensor 140 is less than a temperature threshold. In addition, the electric power control part 56 acquires the detection signal by the temperature sensor 140 from the FC control device 146 while the warming-up control of the FC unit 100 is performed, and determines that the warming-up control of the FC unit 100 has been terminated when the temperature of the FC stack 110 detected by the temperature sensor 140 has become the temperature threshold or more.

[Output Control of FC Unit]

Figure 3:
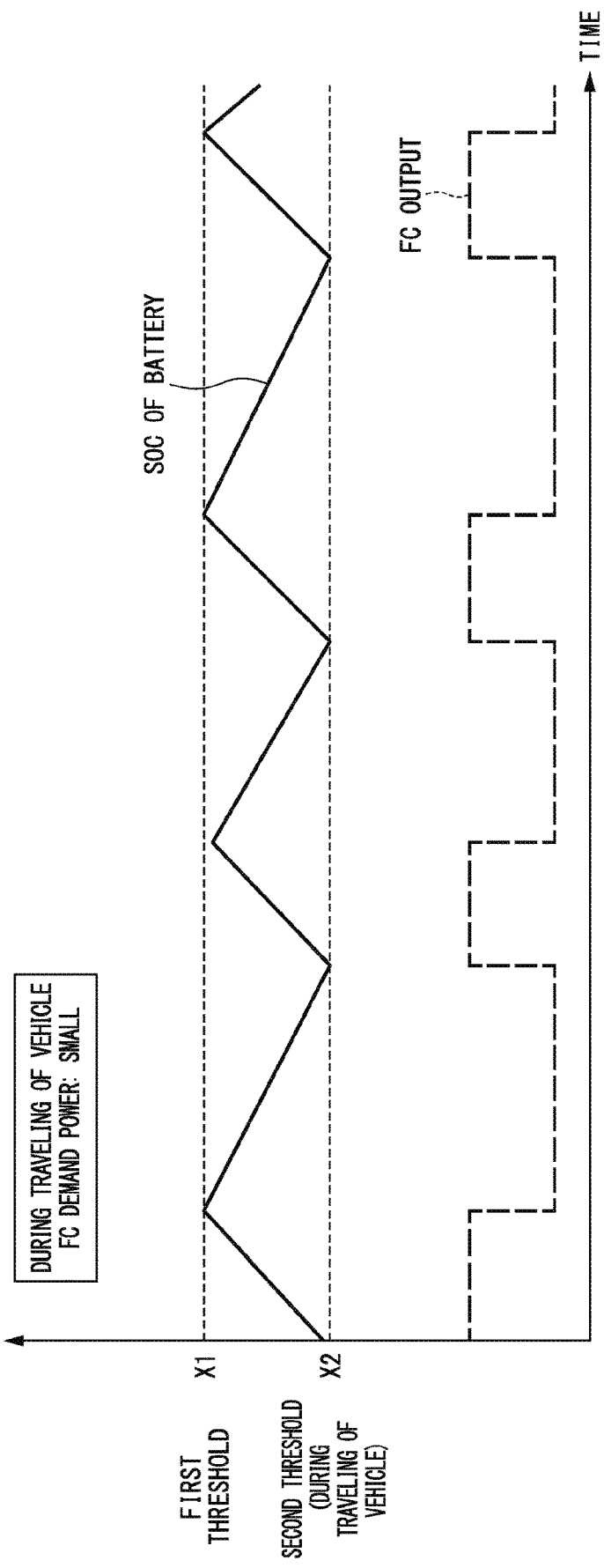
FIG. 3 is a graph showing an example of an SOC of a battery and an FC output during traveling of a vehicle when a required FC electric power is relatively small.

FIG. 3 is a graph showing an example of the SOC of the battery 42 and the electric power output from the FC unit 100 ("FC output") when the a required FC electric power required by the FC unit 100 is relatively small during traveling of the vehicle. In the example shown in FIG. 3, the FC unit 100 outputs the electric power to the battery 42 from the FC unit 100 to increase the SOC of the battery 42 when an initial value of the SOC of the battery 42 is less than a first threshold X1. In this case, for example, the FC unit 100 performs power generation at a generated output with maximum power generation efficiency, and outputs the generated electric power to the battery 42.

Next, the FC unit 100 restricts the electric power output to the battery 42 from the FC unit 100 and reduces the SOC of the battery 42 when the SOC of the battery 42 reaches the first threshold X1. Next, the FC unit 100 returns the electric power output to the battery 42 from the FC unit 100 to a state before restriction and increases the SOC of the battery 42 when the SOC of the battery 42 reaches a second threshold X2. As a result, the control of increasing the SOC of the battery 42 from the second threshold X2 to the first threshold X1 and the control of decreasing the SOC of the battery 42 from the first threshold X1 to the second threshold X2 are repeated.

Figure 4:
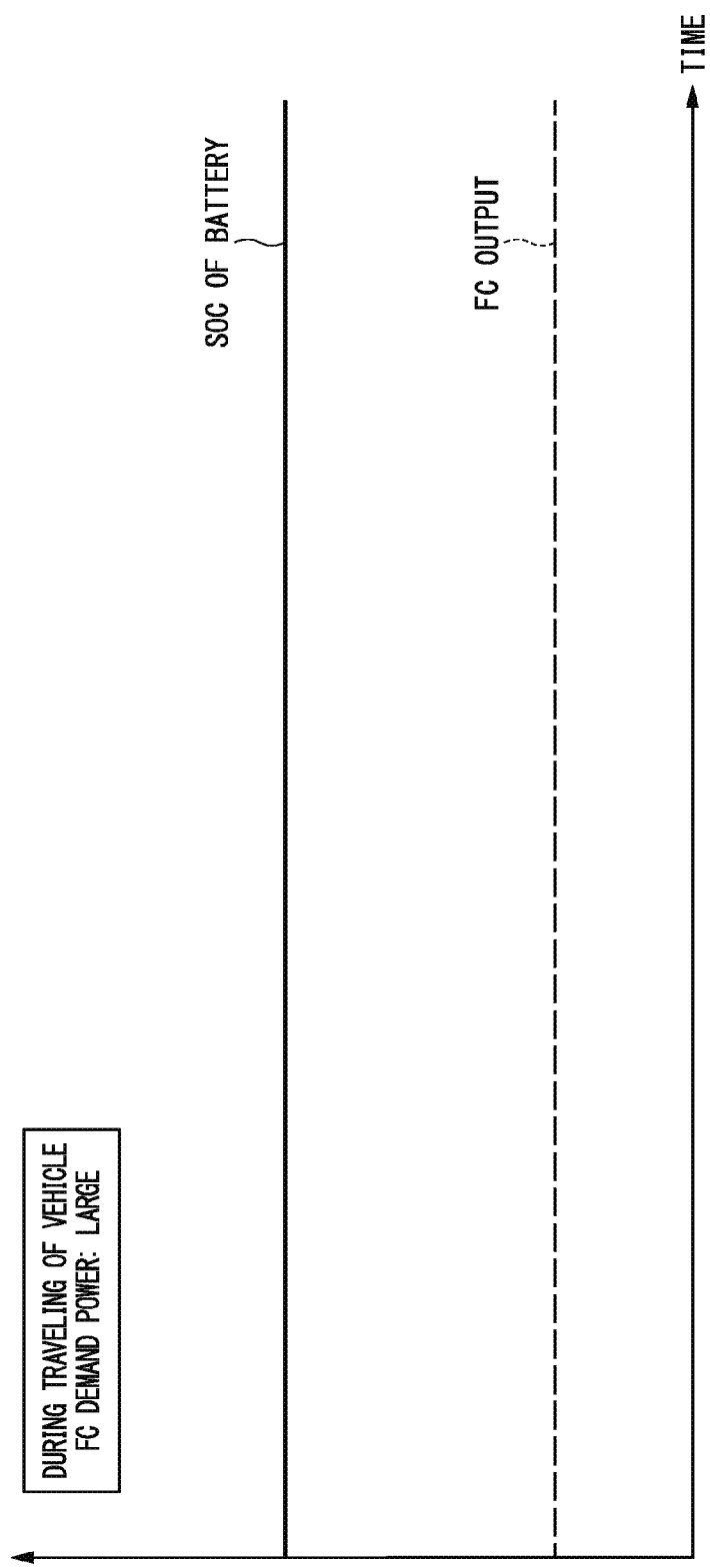
FIG. 4 is a graph showing an example of an SOC of the battery and an FC output during traveling of the vehicle when a required FC electric power is relatively large.

FIG. 4 is a graph showing an example of an SOC of the battery 42 and electric power output from the FC unit 100 when the a required FC electric power required by the FC unit 100 is relatively large during traveling of the vehicle. In the example shown in FIG. 4, the FC unit 100 outputs the driving force used for traveling of the electrically driven vehicle 1 to the driving wheels 14 from the motor 12 using the electric power generated in the FC unit 100 without using the electric power stored in the battery 42. As a result, the SOC of the battery 42 is maintained, power generation in the FC unit 100 is performed according to the a required FC electric power required by the FC unit 100, and the generated electric power is output to the motor 12.

Figure 5:
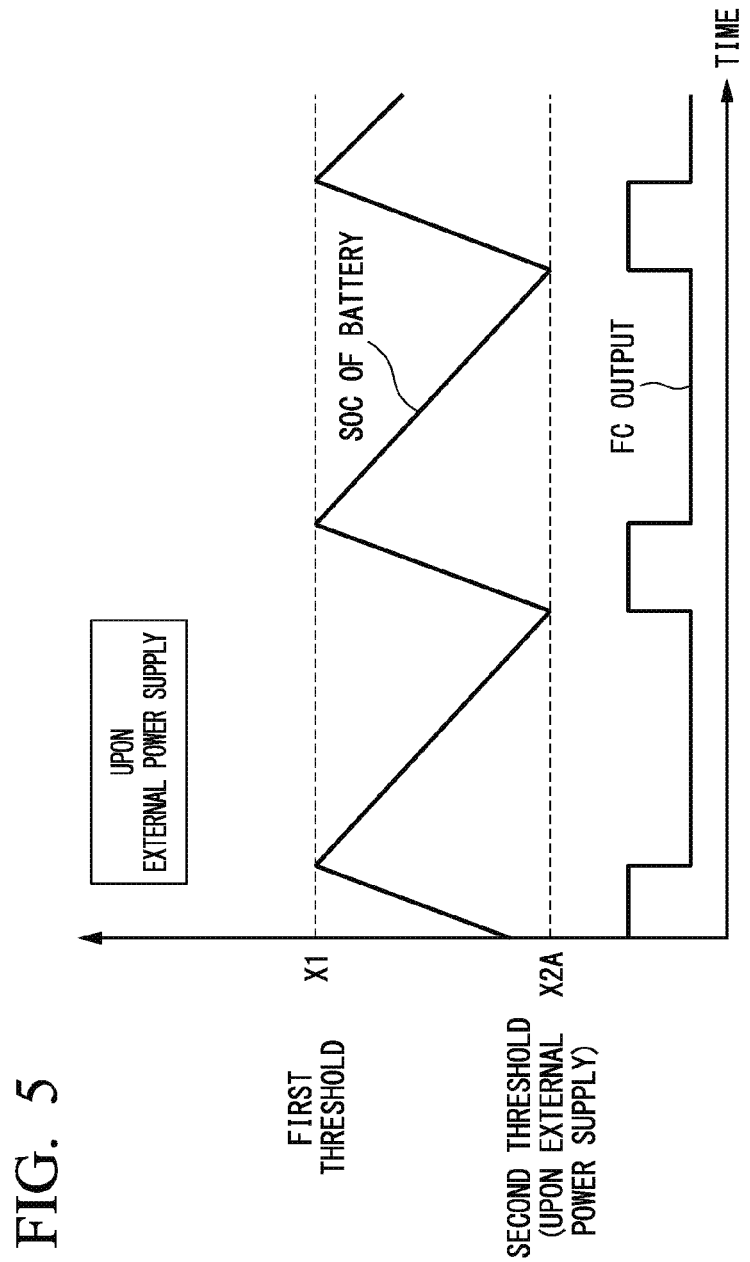
FIG. 5 is a graph showing an example of an SOC of the battery and an FC output upon external power supply.

FIG. 5 is a graph showing an example of an SOC of the battery 42 and electric power output from the FC unit 100 upon external power supply. In the example shown in FIG. 5, the FC unit 100 repeats increasing the SOC of the battery 42 from the second threshold X2A to the first threshold X1 by performing the first control which generates power at the first power generation output and decreasing the SOC of the battery 42 from the first threshold X1 to the second threshold X2A by performing the second control. For example, the second threshold X2A upon external power supply is set to be smaller than in the second threshold X2 during traveling of the vehicle.

[Processing Flow of Fuel Cell System]

Figure 6:
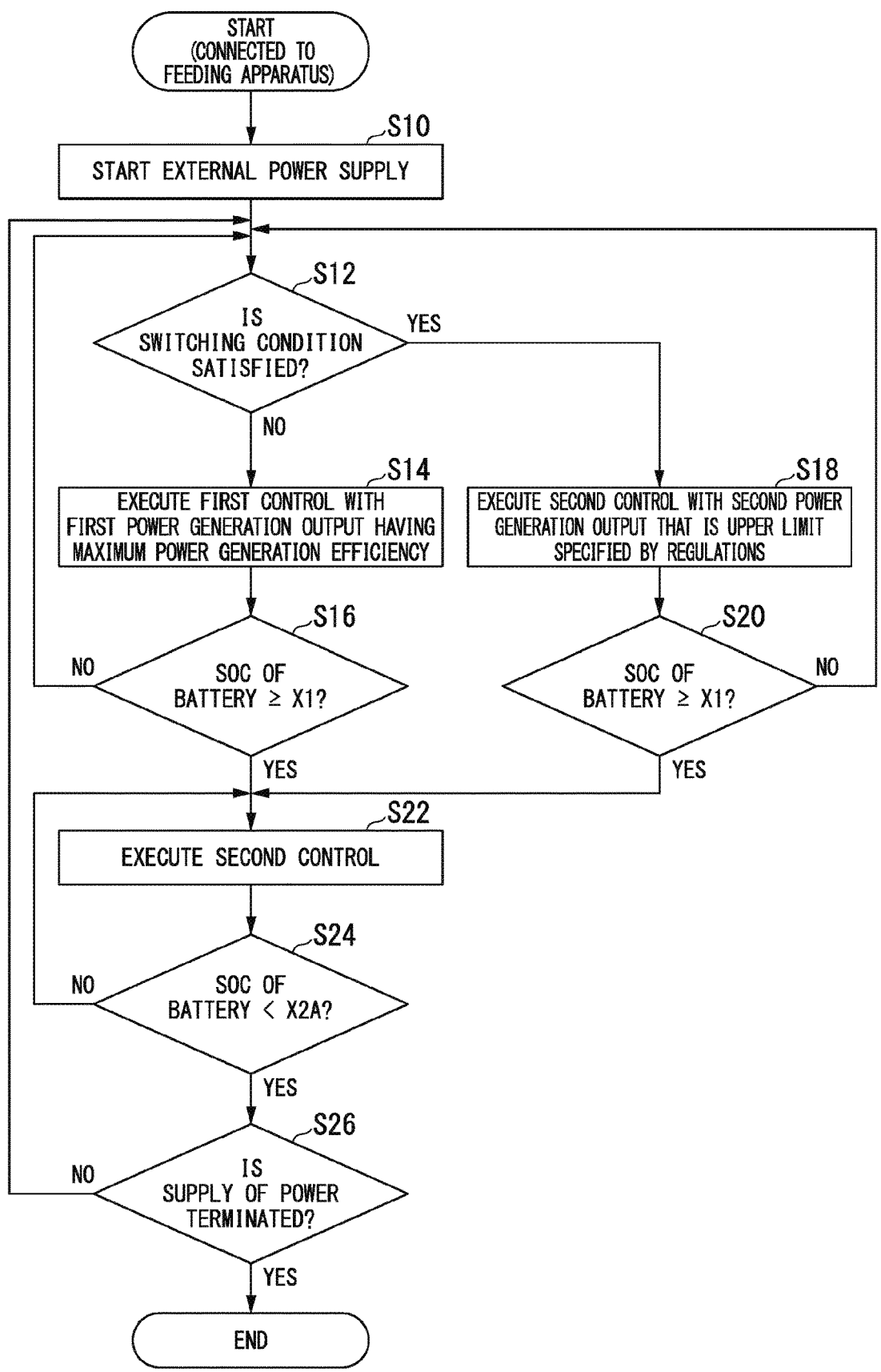
FIG. 6 is a flowchart showing an example of a flow of a series of processes in a fuel cell system according to the first embodiment.

Hereinafter, a flow of a series of processes in the control device 50 that is a control computer of the fuel cell system 10 according to the first embodiment will be described using a flowchart. FIG. 6 is a flowchart showing an example of a flow of processing executed by the control device 50. The flowchart shown in FIG. 6 is executed, for example, when the battery system 40 is connected to the feeding apparatus 210 via the charging port 60.

The electric power control part 56 first starts external power feeding to the feeding apparatus 210 (step S10). The feeding apparatus 210 supplies the electric power stored in the battery 42 to the electrically driven device 220 via the charging port 60 when the external power feeding is started.

The electric power control part 56 determines whether a switching condition is satisfied (step S12). The electric power control part 56 performs first control of causing the FC unit 100 to generate power to a first power generation output which has maximum power generation efficiency when it is determined that the switching condition is not satisfied (step S14). When the FC unit 100 generates power to the first power generation output, the SOC of the battery 42 is increased. Next, the electric power control part 56 determines whether the SOC of the battery 42 calculated by the SOC calculating part 48 is equal to or greater than the first threshold X1 (step S16). The electric power control part 56 returns the processing to step S12 when it is determined that the SOC of the battery 42 is less than the first threshold X1. The electric power control part 56 shifts the processing to step S22 when it is determined that the SOC of the battery 42 is equal to or greater than the first threshold X1.

The electric power control part 56 performs second control of causing the FC unit 100 to generate power to the second power generation output that is an upper limit specified by regulations when the switching condition is satisfied (step S18). When the electric power demand required for the electrically driven device 220 is increased, an increase speed of the SOC of the battery 42 is decreased. However, when the FC unit 100 generates power to the second power generation output, in comparison with the case in which the FC unit 100 generates power to the first power generation output, it is less likely to decrease an increase speed of the SOC of the battery 42. Next, the electric power control part 56 determines whether the SOC of the battery 42 calculated by the SOC calculating part 48 is equal to or greater than the first threshold X1 (step S20). The electric power control part 56 returns the processing to step S12 when it is determined that the SOC of the battery 42 is less than the first threshold X1. The electric power control part 56 shifts the processing to step S22 when it is determined that the SOC of the battery 42 is equal to or greater than the first threshold X1.

Next, the electric power control part 56 performs the second control (step S22). Next, the electric power control part 56 determines whether the SOC of the battery 42 calculated by the SOC calculating part 48 is less than the second threshold X2 (step S24). The electric power control part 56 continues the second control until the SOC of the battery 42 is decreased to be less than the second threshold X2.

The electric power control part 56 determines whether the external power feeding is terminated when it is determined that the SOC of the battery 42 is less than the second threshold X2 (step S26). The electric power control part 56 determines that external power supply is terminated, for example, when connection between the battery system 40 and the feeding apparatus 210 is released or the external power feeding is terminated when a predetermined operation is received. The electric power control part 56 returns the processing to step S12 when it is determined that the external power feeding is not terminated. Then, the electric power control part 56 repeats the first control and the second control until it is determined that the external power feeding is terminated. Meanwhile, the electric power control part 56 completes the processing of the flowchart when it is determined that the external power feeding is terminated.

Figure 7:
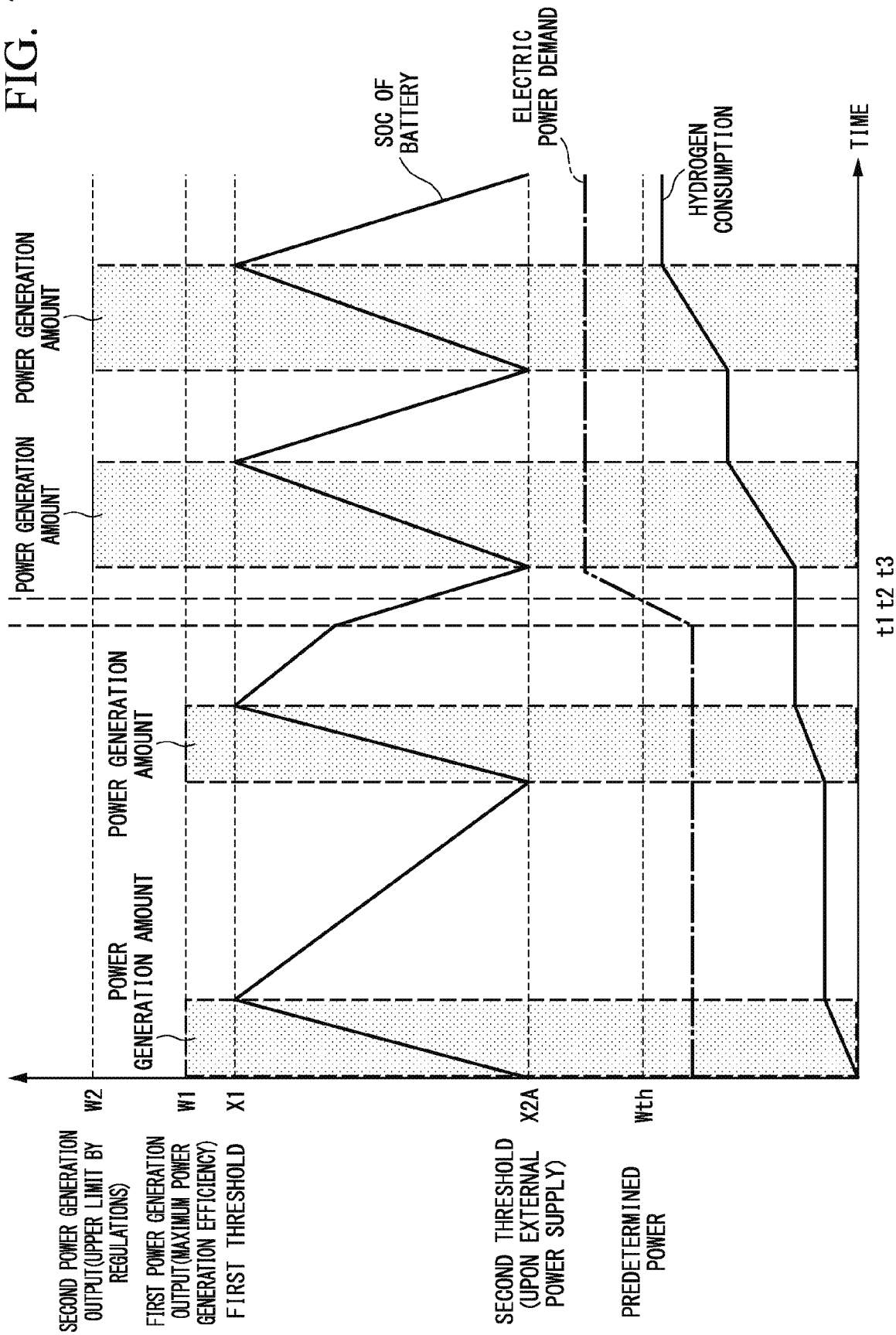
FIG. 7 is a view for describing an example of an operation of the fuel cell system when a switching condition is that "an electric power demand from an electrically driven device is larger than a predetermined electric power."

FIG. 7 is a view for describing an example of an operation of the fuel cell system 10 according to the first embodiment. In the example shown in the drawing, the switching condition is satisfied when the electric power demand from the electrically driven device 220 is greater than the predetermined electric power.

As shown in FIG. 7, when the electric power control part 56 starts supply of external power, control of increasing the SOC of the battery 42 from the second threshold X2A to the first threshold X1 and control of decreasing the SOC of the battery 42 from the first threshold X1 to the second threshold X2A are repeated. In this case, immediately after the electric power control part 56 starts the external power feeding, since the electric power demand from the electrically driven device 220 is less than a predetermined electric power Wth and the switching condition is not satisfied, the generated output when the first control is performed is controlled to a first power generation output W1 which has the maximum power generation efficiency.

In addition, in the example shown, the electric power demand from the electrically driven device 220 is increased at a time t1. Then, since the electric power demand from the electrically driven device 220, i.e., the electric power fed to the electrically driven device 220 becomes greater than the predetermined electric power Wth and the switching condition is satisfied at a time t2, the electric power control part 56 switches the generated output when the first control is performed to a second power generation output W2 that is an upper limit specified by regulations. At a time t3, after the SOC of the battery 42 is reduced to the second threshold X2A, the electric power control part 56 performs the first control of causing the FC unit 100 to generate power to the second power generation output W2.

Figure 8:
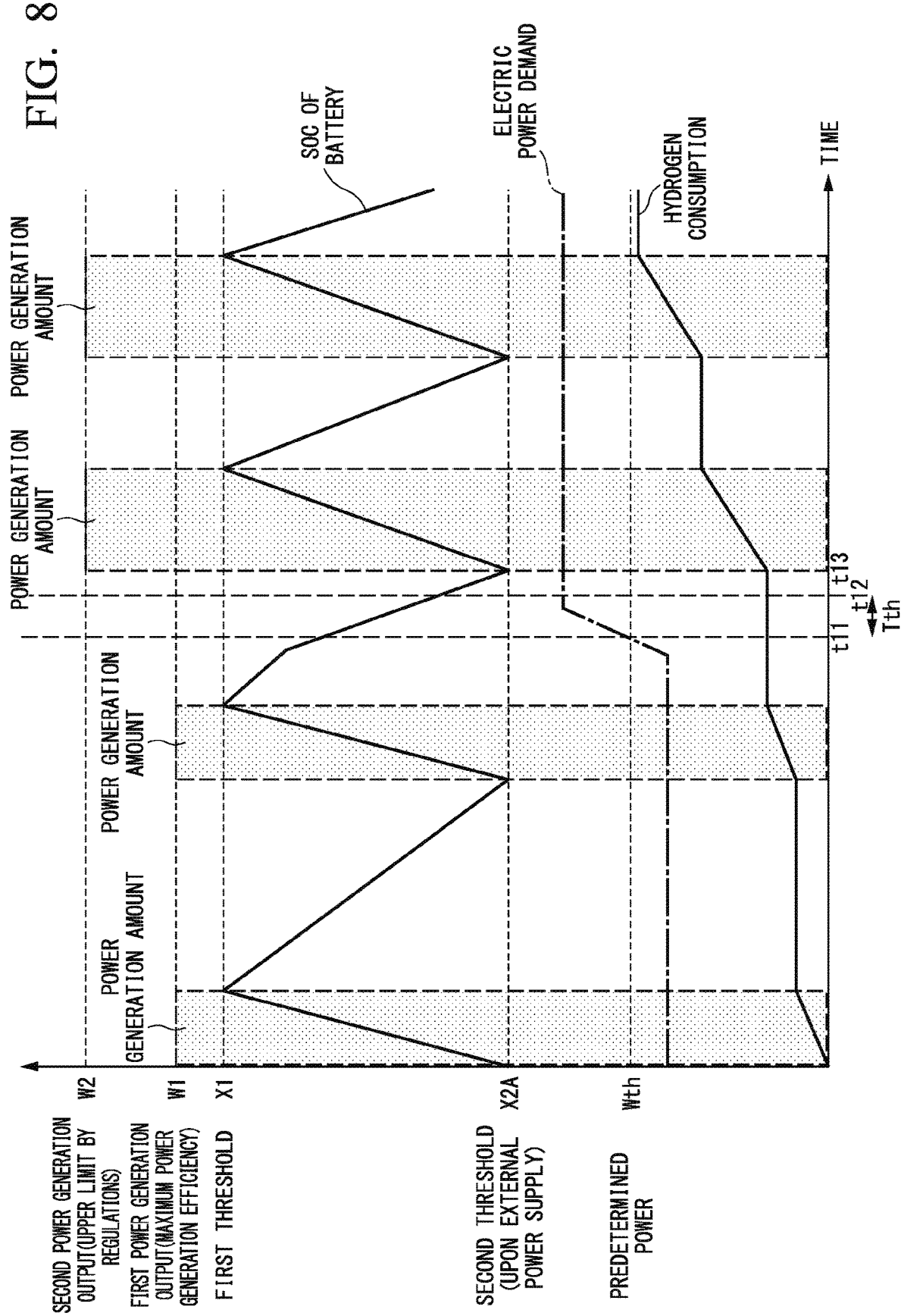
FIG. 8 is a view for describing an example of an operation of the fuel cell system when a switching condition is that "a state in which an electric power demand from an electrically driven device is larger than predetermined electric power is continued for a predetermined time or more."

FIG. 8 is a view for describing another example of an operation of the fuel cell system 10 according to the first embodiment. In the example shown in the drawing, the switching condition is satisfied when a state in which the electric power demand from the electrically driven device 220 is greater than a predetermined electric power continues for a predetermined time or more.

In the example shown in FIG. 8, when the electric power control part 56 starts the external power feeding, at a time t11, the electric power demand from the electrically driven device 220 is greater than the predetermined electric power Wth. In addition, at a time t12, since the switching condition is satisfied when a state in which the electric power demand from the electrically driven device 220 (the electric power fed to the electrically driven device 220) is greater than the predetermined electric power Wth is continued for a predetermined time Tth, the electric power control part 56 switches the power generation output when the first control is performed to the second power generation output W2 that is the upper limit specified by regulations. At a time t13, after the SOC of the battery 42 is reduced to the second threshold X2A, the electric power control part 56 performs the first control of causing the FC unit 100 to generate power to the second power generation output W2.

According to the fuel cell system 10 of the above-mentioned first embodiment, supply of the electric power can be stably performed. For example, when the electric power demand from the electrically driven device 220 is increased, the electric power consumed from the battery 42 is increased, and a time in which the FC unit 100 continuously performs the power generation tends to be lengthened. For this reason, the components of the FC unit 100 may be deteriorated and supply of the electric power may be hindered. Accordingly, according to the fuel cell system 10 of the first embodiment, when the electric power demand from the electrically driven device 220 is greater than the predetermined electric power, in comparison with the case in which the electric power demand from the electrically driven device 220 is equal to or smaller than the predetermined electric power, the power generation output generated in the FC unit 100 is increased when the first control is performed. Accordingly, supply of the electric power can be stably performed.

Second Embodiment

Hereinafter, a second embodiment will be described. Processing contents of the second embodiment are distinguished from those in the first embodiment in that power feeding to an electrically driven device is performed using an external battery provided outside the vehicle as well as the battery 42 according to a function of a feeding apparatus. Hereinafter, these differences will be mainly described.

Figure 9:
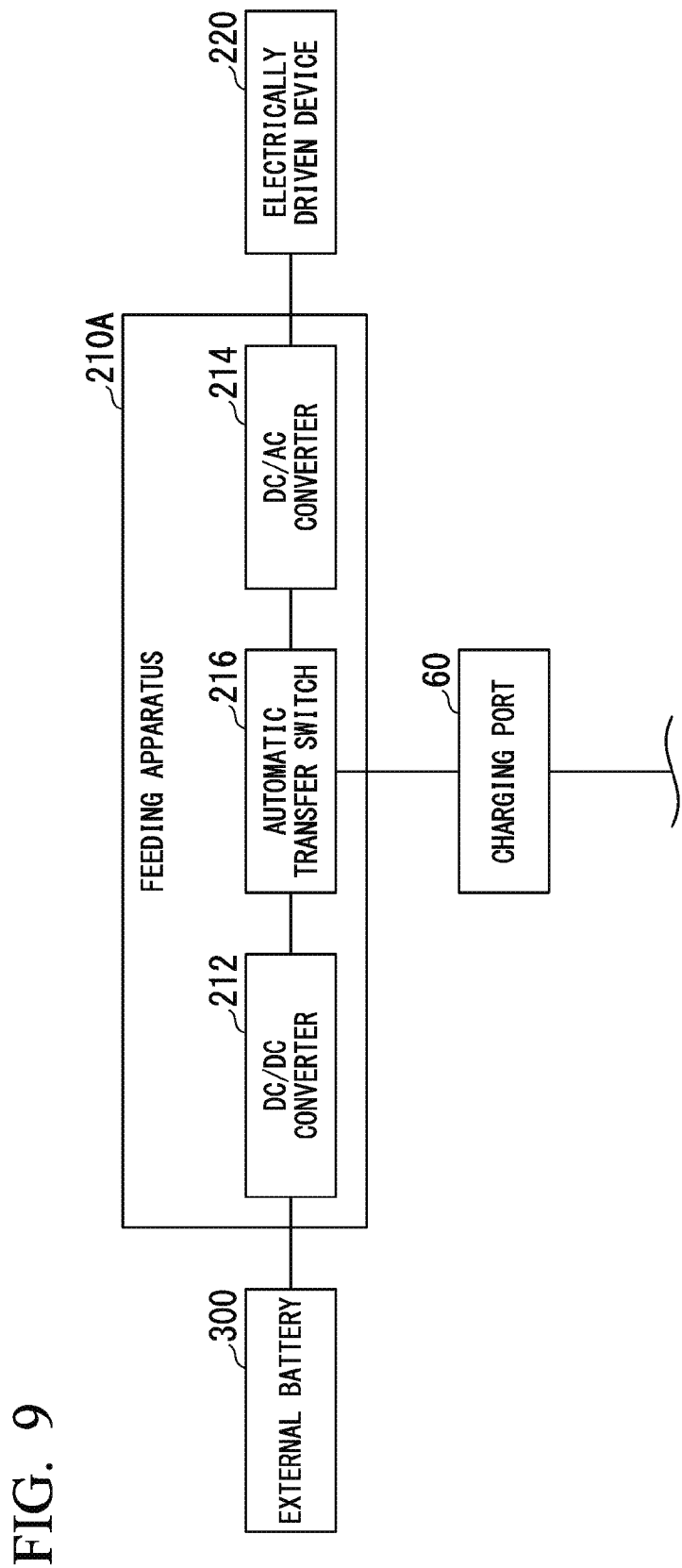
FIG. 9 is a view showing an example of a configuration of a feeding apparatus according to a second embodiment.

FIG. 9 is a view showing an example of a configuration of a feeding apparatus 210A according to the second embodiment. In the example shown in FIG. 9, the feeding apparatus 210A includes, for example, a DC/DC converter 212, a DC/AC converter 214 and an automatic transfer switch 216. The feeding apparatus 210A is able to be connected to the charging port 60, an external battery 300, and the electrically driven device 220.

The external battery 300 is a secondary battery such as a lithium ion battery or the like. The electric power stored in the battery system 40 or the electric power generated by the FC unit 100 is supplied to the external battery 300 via the feeding apparatus 210A. The electric power stored in the external battery 300 is supplied to the electrically driven device 220 via the feeding apparatus 210A.

The DC/DC converter 212 transforms the DC voltage supplied from the external battery 300 to output the transformed DC voltage to the DC/AC converter 214.

The DC/AC converter 214 converts the DC voltage transformed by the DC/DC converter 212 into an AC voltage and outputs the converted AC voltage to the electrically driven device 220. In addition, the DC/AC converter 214 transforms the DC voltage supplied from the battery system 40 or the FC unit 100 via the charging port 60 into a rated AC voltage (for example, 100 [V]) used by the electrically driven device 220 and outputs the rated AC voltage to the electrically driven device 220.

The automatic transfer switch 216 is provided between the DC/DC converter 212 and the DC/AC converter 214 in the feeding apparatus 210A, and connected to the charging port 60. The automatic transfer switch 216 switches the connection between the charging port 60, and the DC/DC converter 212 and the DC/AC converter 214 on the basis of the control from the electric power control part 56. For example, the automatic transfer switch 216 realizes (1) a state in which the electric power output from the battery system 40 or the FC unit 100 is supplied to the external battery 300 and also supplied to the electrically driven device 220, and (2) a state in which the electric power output from at least one of the battery system 40 and the external battery 300 is supplied to the electrically driven device 220.

The automatic transfer switch 216 connects the charging port 60 and the DC/DC converter 212 and connects the charging port 60 and the DC/AC converter 214 when the state of (1) is realized. The automatic transfer switch 216 connects the charging port 60 and the DC/AC converter 214 or connects the DC/DC converter 212 and the DC/AC converter 214 when the state of (2) is realized.

Figure 10:
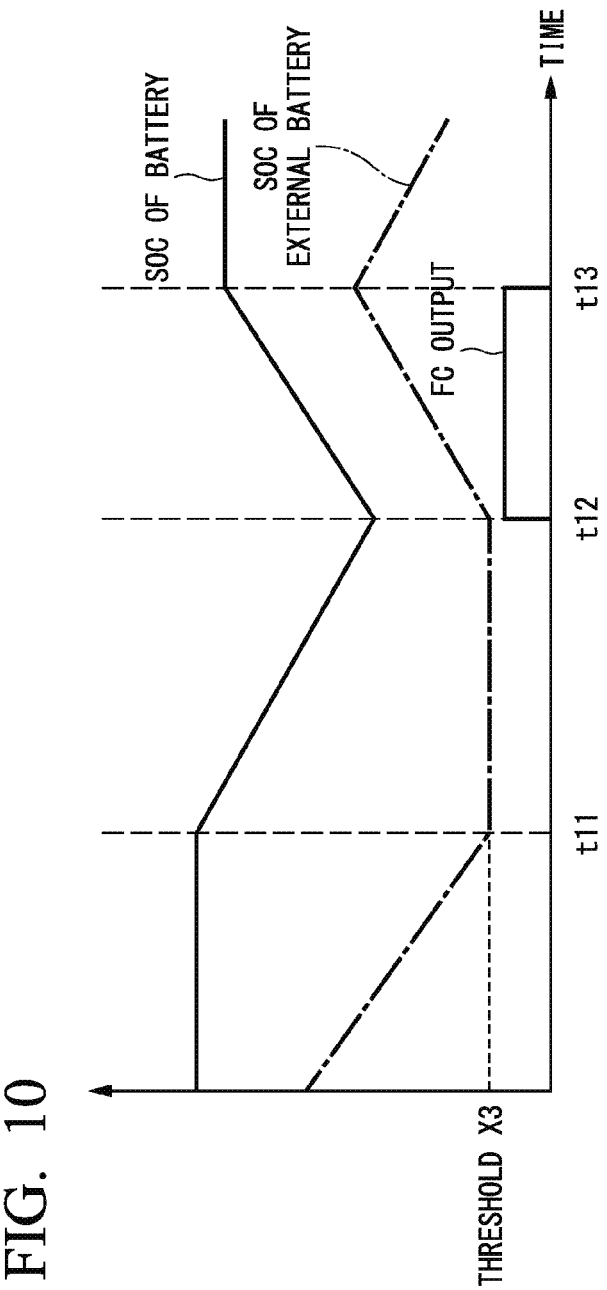
FIG. 10 is a view for describing an operation of a fuel cell system according to the second embodiment.

FIG. 10 is a view for describing an operation of the fuel cell system 10 according to the second embodiment. In the example shown in the drawing, the SOC of the external battery 300 is equal to or greater than the predetermined value at a time when the external power feeding is started.

As shown in FIG. 10, the feeding apparatus 210A feeds the electric power stored in the external battery 300 to the electrically driven device 220 until the SOC of the external battery 300 becomes a predetermined value X3 when the external power feeding is started.

The feeding apparatus 210A feeds the electric power stored in the battery 42 to the electrically driven device 220 when the SOC of the external battery 300 is a threshold X3 at a time t11. In this case, the SOC of the battery 42 is decreased according to supply of the electric power to the electrically driven device 220 from the battery 42.

The feeding apparatus 210A feeds the electric power generated in the FC unit 100 to both of the battery 42 and the external battery 300 when power generation is performed in the FC unit 100 at a time t12. As a result, both of the SOC of the battery 42 and the SOC of the external battery 300 are increased.

The feeding apparatus 210A feeds the electric power stored in the external battery 300 to the electrically driven device 220 until the SOC of the external battery 300 becomes a third threshold X3 again when the power generation in the FC unit 100 is stopped at a time t13.

According to the fuel cell system 10 of the above-mentioned second embodiment, in addition to exhibition of the same effects as those of the fuel cell system 10 according to the first embodiment, since a period of repeating the first control and the second control is lengthened upon external power supply, deterioration of the battery 42 or the like can be minimized.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fuel cell system comprising:
   a fuel cell;
   an electrical storage device configured to store electric power generated by the fuel cell; and
   a control device configured to perform power generation control for at least the fuel cell,
   wherein the control device acquires a charging rate of the electrical storage device,
   when the electric power stored in the electrical storage device is supplied to external devices, the control device performs a first control which causes the fuel cell to generate power and increases a charging rate of the electrical storage device and a second control which restricts a power generation output of the fuel cell to be smaller than that in the first control and decreases a charging rate of the electrical storage device, and
   when a switching condition, in which an electric power demand from the external devices becomes greater than a predetermined electric power or a state in which an electric power demand from the external devices is greater than the predetermined electric power continues for a predetermined time, is satisfied, the control device increases a power generation output generated by the fuel cell during the first control being performed to be larger than that before the switching condition was satisfied.

2. The fuel cell system according to claim 1, wherein, before the switching condition is satisfied, the control device causes the fuel cell to generate power which has a maximum power generation efficiency.

3. The fuel cell system according to claim 1, wherein, after the switching condition is satisfied, the control device causes the fuel cell to generate power that is an upper limit specified by regulations.

4. A method of controlling a fuel cell system, which is performed by a control device of a fuel cell system comprising a fuel cell and an electrical storage device configured to store electric power generated by the fuel cell,
   the method comprising:
   performing power generation control for at least the fuel cell;
   acquiring a charging rate of the electrical storage device;
   when the electric power stored in the electrical storage device is supplied to external devices, performing a first control which causes the fuel cell to generate power and increases a charging rate of the electrical storage device and a second control which restricts a power generation output of the fuel cell to be smaller than that in the first control and decreases a charging rate of the electrical storage device; and
   when a switching condition, in which an electric power demand from the external devices becomes greater than a predetermined electric power or a state in which an electric power demand from the external devices is greater than the predetermined electric power continues for a predetermined time, is satisfied, increasing a power generation output generated by the fuel cell during the first control being performed to be larger than that before the switching condition was satisfied.

5. A computer-readable storage medium, on which a program is stored, the program configured to cause a control computer of a fuel cell system comprising a fuel cell; and an electrical storage device configured to store electric power generated by the fuel cell, to perform:
   processing of performing power generation control for at least the fuel cell;
   processing of acquiring a charging rate of the electrical storage device;
   when the electric power stored in the electrical storage device is supplied to external devices, processing of performing a first control which causes the fuel cell to generate power and increases a charging rate of the electrical storage device and a second control which restricts a power generation output of the fuel cell to be smaller than that in the first control and decreases a charging rate of the electrical storage device; and
   when a switching condition, in which an electric power demand from the external devices becomes greater than a predetermined electric power or a state in which an electric power demand from the external devices is greater than the predetermined electric power continues for a predetermined time, is satisfied, processing of increasing a power generation output generated by the fuel cell during the first control being performed to be larger than that before the switching condition was satisfied.

* * * * *